US010657478B2

(12) United States Patent
Barr et al.

(10) Patent No.: US 10,657,478 B2
(45) Date of Patent: May 19, 2020

(54) AGGREGATED ENTITY RESOURCE TOOL

(71) Applicant: BANK OF AMERICA CORPORATION, Charlotte, NC (US)

(72) Inventors: Willard Andrew Barr, Charlotte, NC (US); Lisa Matarese Braun, Landenberg, PA (US); Brian William Caldwell, Weddington, NC (US); Kevin Patrick Condon, Wilmette, IL (US); Kelly Elizabeth Firment, West Chester, PA (US); Ryan Michael Furey, Charlotte, NC (US); Caroline Hayes Godwin, High Point, NC (US); Matthew Murphy, Charlotte, NC (US); Robert Altemus Pascal, Marblehead, MA (US); George William Taylor, Charlotte, NC (US); Renee Elaine Weiler, Landenberg, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/117,170

(22) Filed: Aug. 30, 2018

(65) Prior Publication Data
US 2018/0374011 A1 Dec. 27, 2018

Related U.S. Application Data (63) Continuation-in-part of application No. 15/353,236, filed on Nov. 16, 2016, now abandoned.
(Continued)

(51) Int. Cl.
*G06Q 10/06* (2012.01)
*G06N 5/04* (2006.01)
(Continued)

(52) U.S. Cl.
CPC ....... *G06Q 10/0637* (2013.01); *G05D 1/0088* (2013.01); *G06F 16/254* (2019.01);
(Continued)

(58) Field of Classification Search
None
See application file for complete search history.

(56) References Cited

U.S. PATENT DOCUMENTS

| 6,389,844 B1 * | 5/2002 | Klein Nagel Voort ..................... F25J 1/0214 62/612 |
| 6,701,342 B1 | 3/2004 | Bartz et al. |

(Continued)

FOREIGN PATENT DOCUMENTS

WO  WO2008092149 A2 * 7/2008 ............. G06Q 10/06

*Primary Examiner* — Patricia H Munson
*Assistant Examiner* — Crystol Stewart
(74) *Attorney, Agent, or Firm* — Michael A. Springs; Moore & Van Allen PLLC; Nicholas C. Russell (57) ABSTRACT

Embodiments of the invention are directed to a system, method, or computer program product for creating a control dashboard for user interactions. The application may be utilized by a user in connection with a third party exchange system, small business, or individually. As such, the invention may extract data from multiple user and competitor locations. The invention coordinates the data and generates components for the dashboard that includes resource flows, outside entity user information, and aggregation integration in a customizable, real-time modified dashboard. Thus providing monitoring and alerts for inventorying, resources, and invoicing. Furthermore, the system may identify underpenetrated customer populations, perform trend analysis to identify potential customers, and the like. Finally, the system integrates an artificial intelligence engine for real-time data digestion and future predictions for resource flows.

17 Claims, 7 Drawing Sheets

Related U.S. Application Data (60) Provisional application No. 62/393,053, filed on Sep. 11, 2016.

(51) Int. Cl.

| | | |
|---|---|---|
| *G06F 16/25* | (2019.01) | |
| *G06Q 40/00* | (2012.01) | |
| *G06Q 30/02* | (2012.01) | |
| *G06N 20/00* | (2019.01) | |
| *G05D 1/00* | (2006.01) | |

(52) U.S. Cl.
CPC ............... *G06N 5/04* (2013.01); *G06N 20/00* (2019.01); *G06Q 10/0633* (2013.01); *G06Q 10/06315* (2013.01); *G06Q 30/0201* (2013.01); *G06Q 30/0202* (2013.01); *G06Q 40/12* (2013.12)

(56) References Cited

U.S. PATENT DOCUMENTS

| | | |
|---|---|---|
| 6,925,493 B1 | 8/2005 | Barkan et al. |
| 6,985,939 B2 | 1/2006 | Fletcher et al. |
| 7,035,944 B2 | 4/2006 | Fletcher et al. |
| 7,079,010 B2 | 7/2006 | Champlin |
| 7,162,318 B1 | 1/2007 | Brearley et al. |
| 7,290,048 B1 | 10/2007 | Barnett et al. |
| 7,343,428 B2 | 3/2008 | Fletcher et al. |
| 7,602,725 B2 | 10/2009 | Vaught |
| 8,055,546 B1* | 11/2011 | Cassone ............ G06Q 30/0201 705/7.29 |
| 8,311,863 B1 | 11/2012 | Kemp |
| 2002/0133368 A1 | 9/2002 | Strutt et al. |
| 2002/0142760 A1 | 10/2002 | Gidron et al. |
| 2002/0173998 A1* | 11/2002 | Case ..................... G06Q 10/04 705/7.39 |
| 2003/0033311 A1 | 2/2003 | Skinner |
| 2003/0135628 A1 | 7/2003 | Fletcher et al. |
| 2004/0133413 A1 | 7/2004 | Beringer et al. |
| 2006/0004622 A1* | 1/2006 | Fanelli ............... G06Q 30/02 705/7.32 |
| 2006/0015380 A1* | 1/2006 | Flinn ................. G06Q 10/0637 705/7.33 |
| 2006/0070030 A1 | 3/2006 | Laborczfalvi et al. |
| 2007/0255701 A1 | 11/2007 | Halla et al. |
| 2007/0283273 A1 | 12/2007 | Woods |
| 2008/0215349 A1* | 9/2008 | Baran .................... G06Q 10/10 705/1.1 |
| 2009/0106234 A1 | 4/2009 | Siedlecki et al. |
| 2010/0107172 A1 | 4/2010 | Calinescu et al. |
| 2011/0145657 A1 | 6/2011 | Bishop et al. |
| 2011/0218837 A1* | 9/2011 | Haynes, III ........ G06Q 30/0202 705/7.31 |
| 2011/0288895 A1* | 11/2011 | Perez, Jr. ............... G06Q 10/06 705/7.12 |
| 2012/0005359 A1 | 1/2012 | Seago et al. |
| 2012/0005584 A1 | 1/2012 | Seago et al. |
| 2012/0016808 A1 | 1/2012 | Ramani et al. |
| 2012/0095956 A1* | 4/2012 | Xiong ................. G06Q 10/067 707/600 |
| 2012/0221502 A1* | 8/2012 | Jerram .................... G06Q 30/02 706/46 |
| 2012/0226690 A1 | 9/2012 | Kheyfets |
| 2012/0303411 A1* | 11/2012 | Chen .................... G06Q 10/087 705/7.31 |
| 2012/0311154 A1 | 12/2012 | Morgan |
| 2014/0040182 A1* | 2/2014 | Gilder ............... G06F 17/30578 707/602 |
| 2014/0164292 A1* | 6/2014 | Haynes .............. G06Q 10/0631 705/36 R |
| 2014/0258032 A1* | 9/2014 | Psota .................... G06Q 30/02 705/26.35 |
| 2015/0088783 A1 | 3/2015 | Mun |
| 2015/0310466 A1* | 10/2015 | LaCivita ............ G06Q 30/0205 705/7.34 |
| 2016/0092898 A1* | 3/2016 | Wang ................. G06Q 30/0206 705/7.35 |
| 2016/0155069 A1* | 6/2016 | Hoover .................. G06Q 30/06 706/12 |
| 2016/0189081 A1* | 6/2016 | Gajdzinski ....... G06Q 10/06393 705/7.39 |
| 2017/0069020 A1* | 3/2017 | Goyal .................... G06Q 40/02 |
| 2017/0132553 A1* | 5/2017 | Theirl ............... G06F 17/30327 |
| 2017/0344933 A1 | 11/2017 | Grichnik et al. |

* cited by examiner

AGGREGATED ENTITY RESOURCE TOOL

CROSS-REFERENCE OF RELATED APPLICATIONS

This application is a continuation-in-part to U.S. patent application Ser. No. 15/353,236, filed Nov. 16, 2016, entitled "Aggregated Entity Resource Tool," which claims priority to U.S. Provisional Patent Application No. 62/393,053, filed Sep. 11, 2016, entitled "Aggregated Entity Resource Tool," the entirety of both are incorporated herein by reference.

BACKGROUND

With advancements in machine and product development, more and more machines and products are being implemented by businesses. The expansion of small businesses and individuals acting as businesses within the internet and product development continues to grow. Managing the requirements of a business, especially a small business or individual, continues to require communications with third party entities for management of the business.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for an interactive control dashboard for small businesses that provides an aggregated entity resource information in a dashboard tool.

In some embodiments, the invention creates a "mission control" dashboard application for individuals distributing products or services. In some embodiments, the individuals may be distributing products or services via a third party exchange system. In other embodiments, the individuals may be multiple individuals running a business. The application may be utilized by a small business, individual, large business, or the like, and comprises several components. The first component includes providing the user with information about how the user is using financial institution products. The dashboard shows a user friendly view of payments, lending, merchant service history, and the like extracted from the financial institution internal servers. The second component includes providing the user with information from outside entities associated with the business. These entities maybe associated with payroll, business expenses such as staffing or the like. The system may reach out to the outside entities to extract data about the business, the business may provide the data, and/or a third party aggregation service may provide the data for the business. The third component includes providing a marketing/business advancement component. This component combines data from the business, a third party, and the financial institution to identify serval marketing or strategy suggestions for marketing or business growth. In this way, the system identifies business successes, competitor successes, and industry performance within a geographic area. Another component may include an artificial intelligence engine that may review historic user data and predict inflows, outflows, expenses, tax issues, inventory, and the like at a future time.

Furthermore, the system may identify business underpenetrated customer populations, perform trend analysis to identify potential customers, and the like. Using this data, the system may generate marketing concepts for the business to target the underpenetrated customer populations. In addition, the system may monitor and provide recommendations for inventorying and invoicing. As such, the system may track trending data, past orders of the business, and the like to predict inventory requirements for the business using the artificial intelligence engine. The system may examine market changes in the inventory and provide the business with a time frame to purchase inventory and a recommended way (cash, credit, or the like) to purchase the inventory.

Embodiments of the invention relate to systems, methods, and computer program products for: implementing within a user system, wherein the user system communicates with a third party exchange system; uplinking, with user authorization, the user system and third party systems for extraction of resource flows of the user; processing competitor sales and inventory and aggregate the competitor sales and inventory; generating, via artificial intelligence engine, a predicted future resource flow comparison; generating an interactive dashboard for visualization of categories, wherein the categories include a use of third party resources, system resources, and aggregation data across from aggregation of the competitor sales and inventory in an industry; allowing access to the user system, the third party systems, and the system resources for inventory and resource distribution; and presenting interactive dashboard on display of the user system with overlaid predicted future resource flow comparison from the artificial intelligence engine.

In some embodiments, generating the predicted future resource flow comparison comprises receiving real-time data from the user system and third party systems and correlating the real-time data with historic data for predictive analysis of future resource flows.

In some embodiments, the invention further comprises identifying underrepresented customers and trends for identify potential customers for the user from online and offline.

In some embodiments, presenting the interactive dashboard further comprises presenting inventory purchase recommendations based on market analysis for products of the inventory and identified predicted price fluctuation for the products of the inventory.

In some embodiments, the invention further comprises generating a private communicable linkage with the third party systems for integration of the aggregated resource application into the third party systems and the user system.

In some embodiments, the aggregated resource application is provided by a resource distribution entity used by the user, wherein the resource distribution entity is a financial institution providing payroll, loan options, insurance, or account storage for the user, wherein the user is a small business.

In some embodiments, implementing within the user system further comprises integration of the interactive dashboard for visualization of categories that allows the user for selection and third party system interaction.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any entity or individual that may buy or sell products/services. In some embodiments, the user may be the business. In some embodiments, the user may be an individual distributing products/services on a third party exchange system. In some embodiments, the business may be a small business, such as one with under 500 employees. In yet other embodiments, the business may be a larger business, such as one with 500 or more employees. In some embodiments, identities of an individual may include online handles, usernames, aliases, family names, maiden names, nicknames, or the like. Furthermore, as used herein the term "user device" or "mobile device" may refer to mobile phones, personal computing devices, tablet computers, wearable devices, and/or any portable electronic device capable of receiving and/or storing data therein associated with the business.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In some embodiments, the invention creates a "mission control" dashboard application for individuals distributing products or services. In some embodiments, the individuals may be distributing products or services via a third party exchange system. In other embodiments, the individuals may be multiple individuals running a business. The application may be utilized by a small business, individual, large business, or the like, and comprises several components. The first component includes providing the user with information about how the user is using financial institution products. The dashboard shows a user friendly view of payments, lending, merchant service history, and the like extracted from the financial institution internal servers. The second component includes providing the user with information from outside entities associated with the business. These entities maybe associated with payroll, business expenses such as staffing or the like. The system may reach out to the outside entities to extract data about the business, the business may provide the data, and/or a third party aggregation service may provide the data for the business. The third component includes providing a marketing/business advancement component. This component combines data from the business, a third party, and the financial institution to identify serval marketing or strategy suggestions for marketing or business growth. In this way, the system identifies business successes, competitor successes, and industry performance within a geographic area. Another component may include an artificial intelligence engine that may review historic user data and predict inflows, outflows, expenses, tax issues, inventory, and the like at a future time.

Furthermore, the system may identify business underpenetrated customer populations, perform trend analysis to identify potential customers, and the like. Using this data, the system may generate marketing concepts for the business to target the underpenetrated customer populations. In addition, the system may monitor and provide recommendations for inventorying and invoicing. As such, the system may track trending data, past orders of the business, and the like to predict inventory requirements for the business using the artificial intelligence engine. The system may examine market changes in the inventory and provide the business with a time frame to purchase inventory and a recommended way (cash, credit, or the like) to purchase the inventory.

Embodiments of the present invention address the above needs and/or achieve other advantages by providing apparatuses (e.g., a system, computer program product and/or other devices) and methods for generation an interactive mission control dashboard for small businesses.

Figure 1:
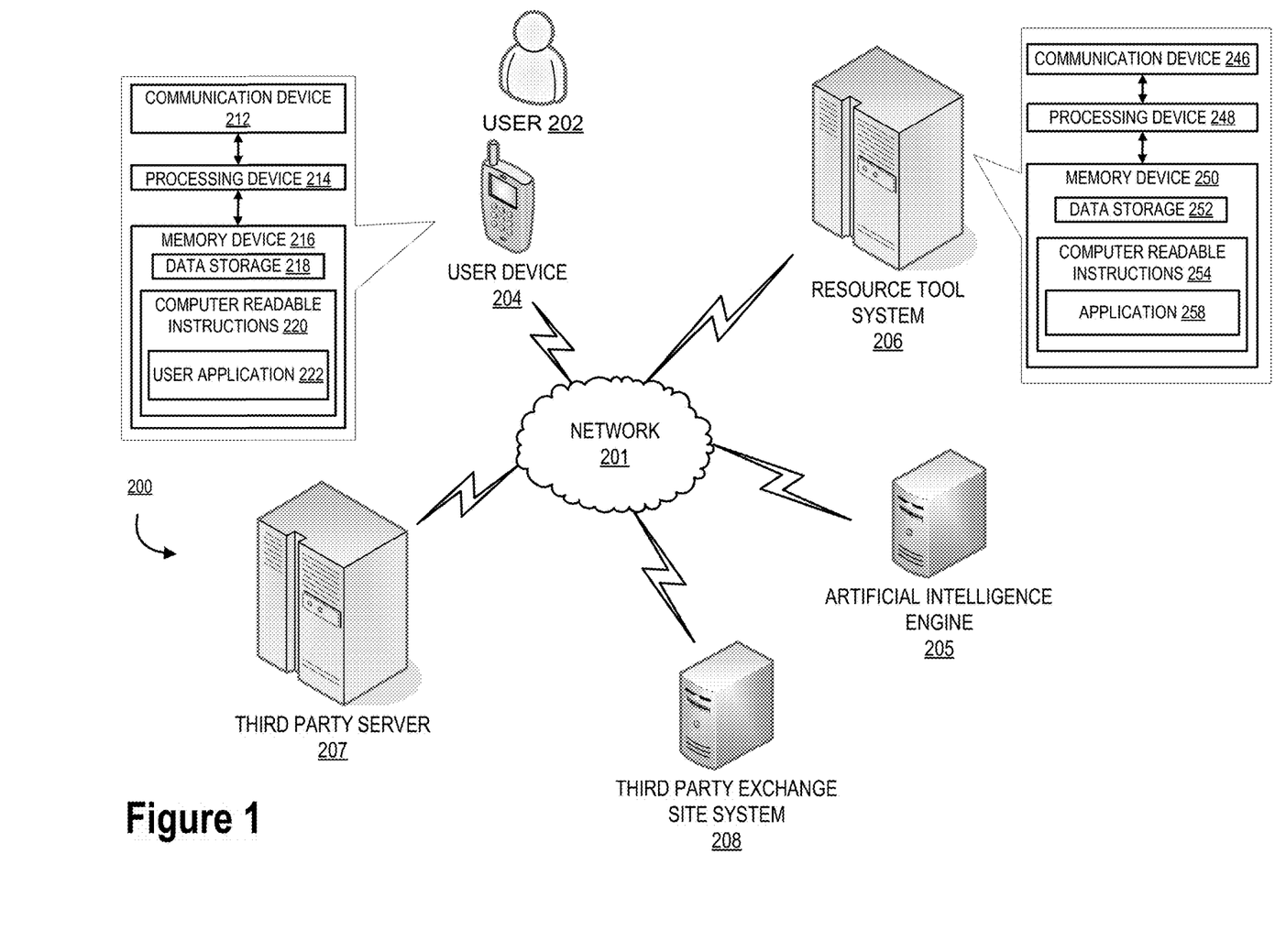
FIG. 1 provides an aggregated entity resource tool system environment, in accordance with one embodiment of the present invention.

FIG. 1 illustrates an aggregated entity resource tool system environment 200, in accordance with one embodiment of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of generating an interactive dashboard with aggregated entity data.

As illustrated in FIG. 1, the third party exchange site system 208 is operatively coupled, via a network 201 to the user device 204, artificial intelligence engine 205, third party servers 207, and to the resource tool system 206. In this way, the third party exchange site system 208 can send information to and receive information from the user device 204, artificial intelligence engine 205, third party servers 207, and the resource tool system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has one or more user devices 204 associated with a business, such as a small business, side business, single individual buyer/seller via third party exchange systems, large business, or the like. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the resource tool system 206, the third party exchange site system 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the resource tool system 206.

As further illustrated in FIG. 1, the resource tool system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the third party exchange site system 208, the third party server 207, the artificial intelligence engine 205, and the user device 204. As such, the communication device 246 generally comprises a modem, server, or other device for communicating with other devices on the network 201.

As further illustrated in FIG. 1, the resource tool system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the resource tool system 206 the memory device 250 stores an application 258. In one embodiment of the invention, the application 258 may associate with applications having computer-executable program code that generate and code a tag for implementation onto a product. Furthermore, the resource tool system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more third party exchange site system 208, third party servers 207, artificial intelligence engine 205, and/or user device 204.

In the embodiment illustrated in FIG. 1 and described throughout much of this specification, the application 258 may generate and display a dashboard on the user device 204 via a communication channel through the network 201. The communication channel may be closed and secure, such that the application 258 may present sensitive business information about business resources, business marketing, artificial intelligence, and the like to the user device 204.

As illustrated in FIG. 1, the third party server 207 is connected to the third party exchange site system 208, user device 204, artificial intelligence engine 205, and resource tool system 206. The third party server 207 has the same or similar components as described above with respect to the user device 204 and the resource tool system 206. While only one third party server 207 is illustrated in FIG. 1, it is understood that multiple third party servers 207 may make up the system environment 200. The third party server 207 may be associated with one or more financial institutions, insurance corporations, staffing agencies, product providers, marketers, permit providers, material providers, resource allocators, and the like. In this way, the third party servers 207 may be associated with any third party that the user uses in the line of business.

As illustrated in FIG. 1, the artificial intelligence engine 205 is connected to the third party exchange site system 208, user device 204, third party server 207, and resource tool system 206. The artificial intelligence engine 205 has the same or similar components as described above with respect to the user device 204 and the resource tool system 206. While only one artificial intelligence engine 205 is illustrated in FIG. 1, it is understood that multiple artificial intelligence engine 205 may make up the system environment 200. The artificial intelligence engine 205 may comprise a separate twin artificial intelligence (AI) engine continually injects current payroll, transactions, inventory, and the like. As such, this serves as a proxy to conscious decisions making process assessing the future resource flow predictions for the user.

As illustrated in FIG. 1, the third party exchange site system 208 is connected to the third party server 207, user device 204, artificial intelligence engine 205, and resource tool system 206. The third party exchange site system 208 may be associated with a third party that provides a means for buying, selling, or otherwise exchanging products/services. The third party exchange site system 208 has the same or similar components as described above with respect to the user device 204 and the resource tool system 206. While only one third party exchange site system 208 is illustrated in FIG. 1, it is understood that multiple third party exchange site system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The third party exchange site system 208 may generally include a processing device communicably coupled to devices as a memory device, output devices, input devices, a network interface, a power source, one or more chips, and the like. The third party exchange site system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the third party exchange site system 208 described herein.

Figure 2:
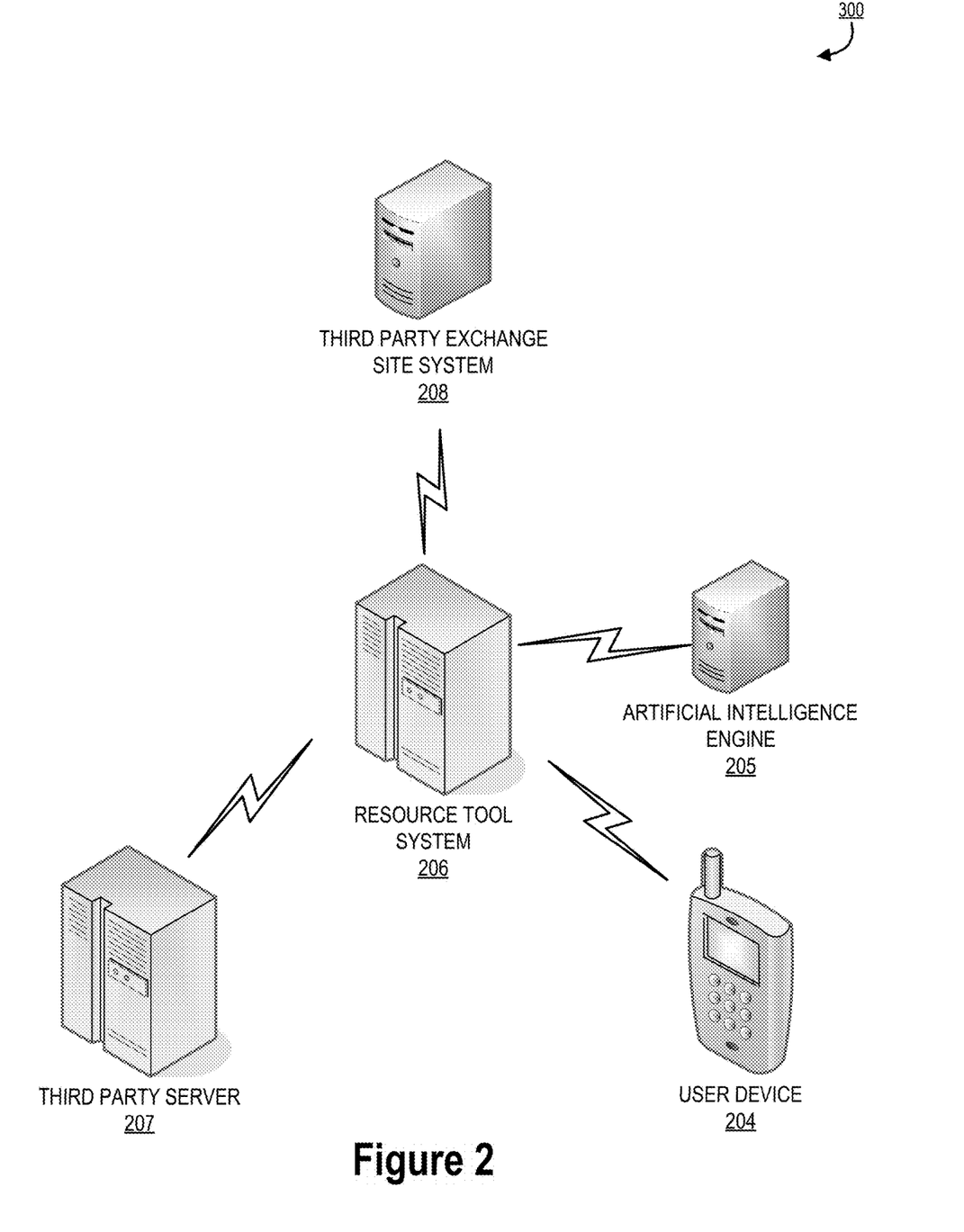
FIG. 2 provides a communication linkage generation system environment, in accordance with one embodiment of the present invention.

FIG. 2 illustrates a communication linkage generation system environment 300, in accordance with one embodiment of the present invention. As illustrated, the resource tool system 206 is linked via a private communicable linkage to the third party server 207, the user device 204, and the third party exchange site system 208. Furthermore, the resource tool system 206 is directly in communication with the artificial intelligence engine 205 to continually distribute data including transaction data, payroll data, inventory data, customer data, competitor data, and the like. The artificial intelligence engine 205 utilizes this data to provide predictive future information about the user and support the resource tool system 206.

The resource tool system 206 may extract information from a third party server 207, the user device 204, and the third party exchange site system 208 related to the user, resource flow of selling/buying, and the like. This information may be resource information, invoice information, inventory information, bill information, shipping information, customer information, payment information, competitor information, employee information, or the like. In this way, the resource tool system 206 may extract information from the third party server 207. As such, the user business may communicate an approval and authorization to the third party server 207 to allow the resource tool system 206 to extract data from the third party server 207 related to the user business. Furthermore, the user via the user device 204 may allow for the resource tool system 206 to extract data about the user from the servers. In other embodiments, the user may provide information via user input on the user device to the resource tool system 206 for the aggregated entity resource dashboard. As illustrated, the third party exchange site system 208 associated with the entity providing the resource tool system 206 may provide information about user selling and/or buying products/services. Furthermore, the resource tool system 206 may further extract information from third party systems 207 that may be associated with a financial institution, tax agencies, accounting, inventory, and the like that provides payroll, loans, insurance, or the like for the user.

Figure 3:
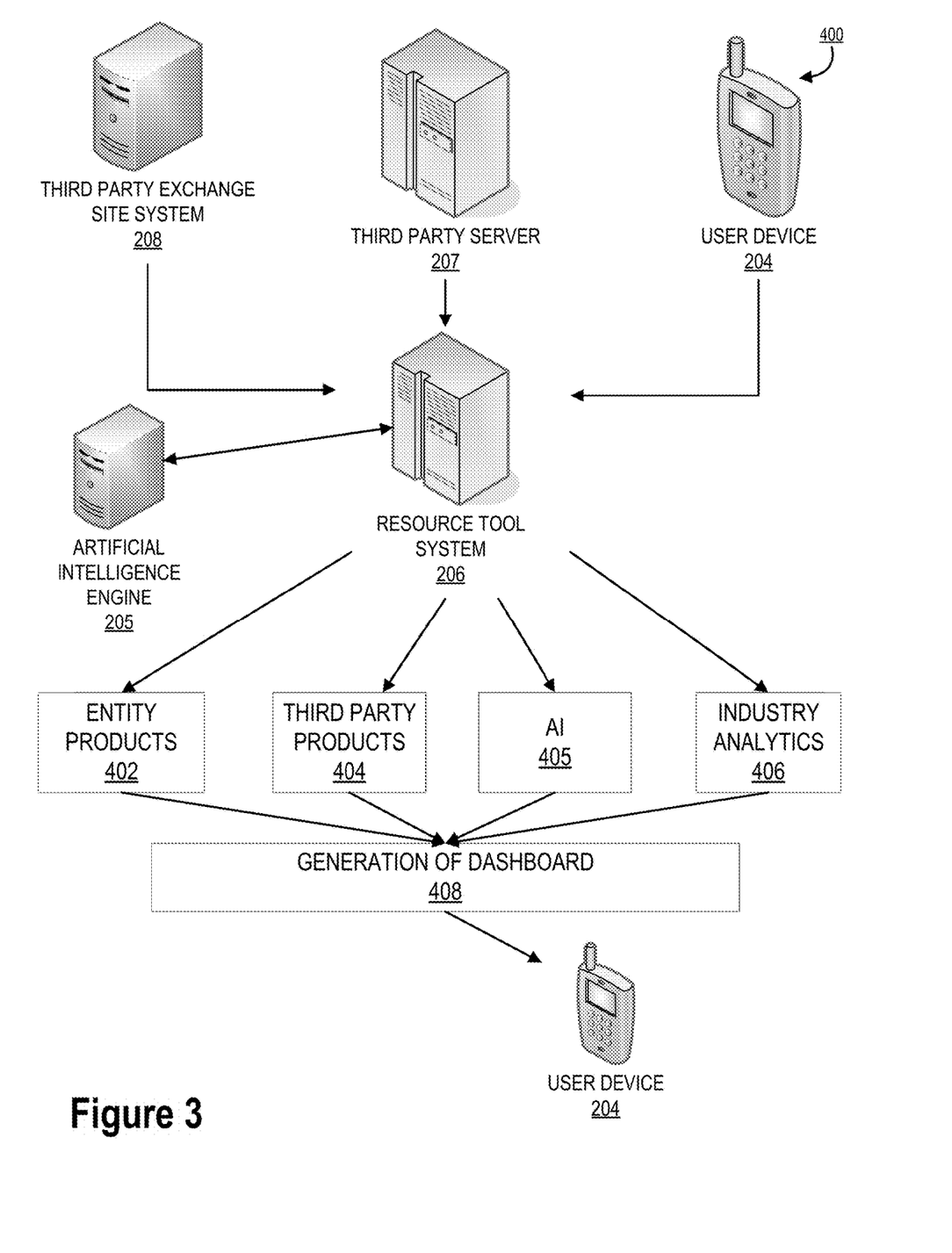
FIG. 3 provides a resource distribution system architecture environment, in accordance with one embodiment of the present invention.

FIG. 3 illustrates a resource distribution system architecture environment 400, in accordance with one embodiment of the present invention. As illustrated, the third party exchange site system 208, the third party server 207, and the user device 204 may provide the resource tool system 206 with information in the form of data packets that includes information about the business from those entities. The resource tool system 206 may receive information about the entity products 402 that the user utilizes. These entity products 402 may be products provided by the entity associated with the resource tool system 206. In some embodiments, these entity products 402 may include financial institution provided products, such as payments, lending, merchant service history, and the like extracted from the financial institution internal servers, such as the third party exchange site system 208.

In some embodiments, the resource tool system 206 may receive and process the third party products 404 used by the user. In some embodiments, the resource tool system 206 may extract the third party products 404 from the third party server 207 upon approval from the user. In other embodiments, the third party server 207 may provide the resource tool system 206 with the third party products 404 from the third party server 207. In this way, these entities maybe associated with payroll, business expenses such as staffing or the like. The system may reach out to the outside entities to extract data about the user, the user may provide the data, and/or a third party aggregation service may provide the data for the user.

In some embodiments, the resource tool system 206 may communicate directly with the artificial intelligence engine 205 to provide the artificial intelligence engine 205 with data, inflows, outflows, expenses, tax issues, inventory, and the like in continuous communication for the artificial intelligence engine 205 to provide a predicted resource flow information for the user at a future time.

Furthermore, the system may identify business underpenetrated customer populations, perform trend analysis to identify potential customers, and the like. Using this data, the system may generate marketing concepts for the business to target the underpenetrated customer populations. In addition, the system may monitor and provide recommendations for inventorying and invoicing. As such, the system may track trending data, past orders of the business, and the like to predict inventory requirements for the business using the artificial intelligence engine. The system may examine market changes in the inventory and provide the business with a time frame to purchase inventory and a recommended way (cash, credit, or the like) to purchase the inventory.

In some embodiments, the resource tool system 206 may generate industry analytics 406. The resource tool system 206 preforms analytics to the entity system data, the third party server data, the user device data, and data from aggregation services to, in some embodiments, provide a marketing/business advancement components to the dashboard. As such, combines data from the business, third parties, aggregation entities, and the financial institution to identify serval marketing or strategy suggestions for marketing or business growth. In this way, the resource tool system 206 identifies business successes, competitor successes, and industry performance within a geographic area. Furthermore, the resource tool system 206 may identify business underpenetrated customer populations, perform trend analysis to identify potential customers, and the like. Using this data, the resource tool system 206 may generate marketing concepts for the business to target the underpenetrated customer populations. In addition, the resource tool system 206 may monitor and provide recommendations for inventorying and invoicing. As such, the resource tool system 206 may track trending data, past orders of the business, and the like to predict inventory requirements for the business. The resource tool system 206 may examine market changes in the inventory and provide the business with a time frame to purchase inventory and a recommended way (cash, credit, or the like) to purchase the inventory.

In some embodiments, the resource tool system 206 may also provide an artificial intelligence (AI) interface section to the dashboard, as illustrated in block 405. The AI interface utilizes data from the third party server data, the user device data, and data from aggregation services for future analytics. As such, combines data from the business, third parties, aggregation entities, users, and the financial institution to identify future resource flow, inventory, and the like. As such, the artificial intelligence engine 205 aids the resource tool system 206 for tracking and predicting future data about the user and business based on trending data, past orders of the business, payroll, resource flow, and the like.

Once the resource tool system 206 receives the data, the resource tool system 206 may process the data to generate a dashboard, as illustrated in block 408. The dashboard may be provided to the user, who may be an individual associated with a small business. The user may be a president, executive, officer, or employee of the small business. The dashboard may provide an interactive selectable view of the entity products 402, the third party products 404, and the industry analytics 406. Furthermore, the dashboard may link to the third party exchange site system 208 and the third party servers 207 to interact with and perform functions at the third party exchange site system 208 and the third party servers 207 via the dashboard in order to operate and run the user's business.

Figure 4:
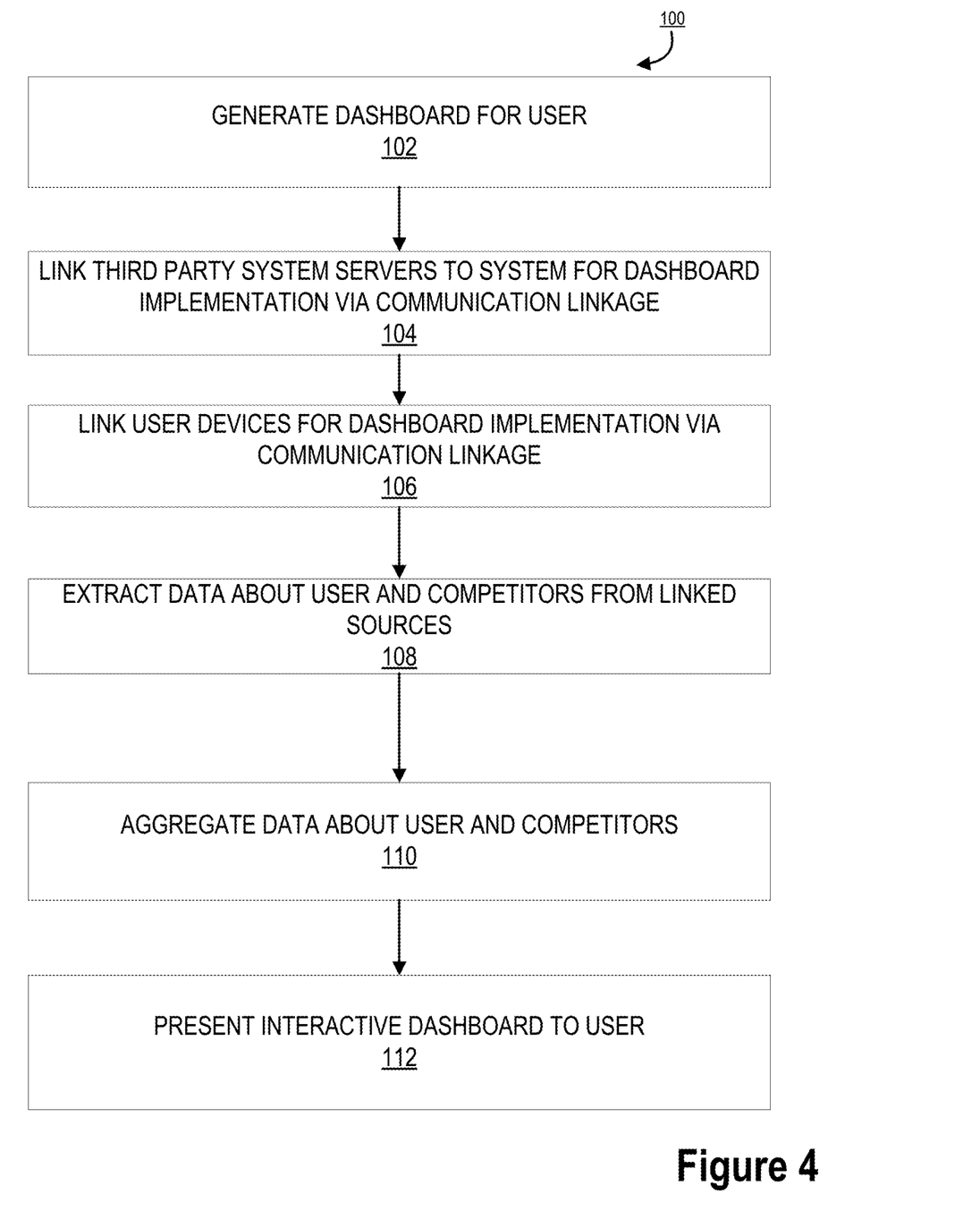
FIG. 4 provides a high level process flow illustrating building the aggregated entity resource tool, in accordance with one embodiment of the present invention.

FIG. 4 illustrates a high level process flow illustrating building the aggregated entity resource tool 100, in accordance with one embodiment of the present invention. As illustrated in block 102, the process 100 is initiated by generating a dashboard for the user. The dashboard may allow for interactive visualization and management of resources, invoices, inventory, and the like.

As illustrated in block 104, the process 100 continues by linking the third party system servers to the system for use on the dashboard via a communication linkage. As such, the system may be able to extract, upon user authorization, user information from the third party systems, such as products from the third party that the user utilizes from the third party. This may include, but is not limited to products associated with marketing, customers, resource, payroll, employee, invoice, inventory, or the like. Next, as illustrated in block 106, the process 100 continues by linking the user devices that are associated with the user and/or user business to the system for dashboard implementation via the communication linkage. In this way, the system may link the user devices associated with the user in order to receive data associated with the user and/or the user business. In some embodiments, the system may receive information about the business from input from the user. In other embodiments, the system may extract data about the business from the user systems. Furthermore, the system may link, via internal communication linkage to the entity system that sponsors the resource tool system.

Next, as illustrated in block 108, the process 100 continues by extracting data about the user and the user competitors from the communicable linked sources. In some embodiments, the linked sources may provide the information. In other embodiments, the system may extract the data from the linked sources based on an authentication approval.

As illustrated in block 110, the process 100 continues by aggregating the data about the business and the competitors. The aggregated data is compiled and analyzed for presentation of an interactive dashboard to the user, as illustrated in block 112. In this way, the dashboard creates a mission control dashboard application for the user. The application may be utilized by an individual user, small business associated with the user, or the like. In some embodiments, one component includes providing the user with information about how the user is using financial institution products. The dashboard shows a user friendly view of payments, lending, merchant service history, and the like extracted from the financial institution internal servers. The second component includes providing the user with information from outside entities associated with the business. These entities maybe associated with payroll, business expenses such as staffing or the like. The system may reach out to the outside entities to extract data about the business, the business may provide the data, and/or a third party aggregation service may provide the data for the business. The third component includes providing a marketing/business advancement component. This component combines data from the business, a third party, and the financial institution to identify serval marketing or strategy suggestions for marketing or business growth. In this way, the system identifies business successes, competitor successes, and industry performance within a geographic area. Another component may include an artificial intelligence engine that may review historic user data and predict inflows, outflows, expenses, tax issues, inventory, and the like at a future time.

Furthermore, the system may identify business underpenetrated customer populations, perform trend analysis to identify potential customers, and the like. Using this data, the system may generate marketing concepts for the business to target the underpenetrated customer populations. In addition, the system may monitor and provide recommendations for inventorying and invoicing. As such, the system may track trending data, past orders of the business, and the like to predict inventory requirements for the business using the artificial intelligence engine. The system may examine market changes in the inventory and provide the business with a time frame to purchase inventory and a recommended way (cash, credit, or the like) to purchase the inventory.

Figure 5:
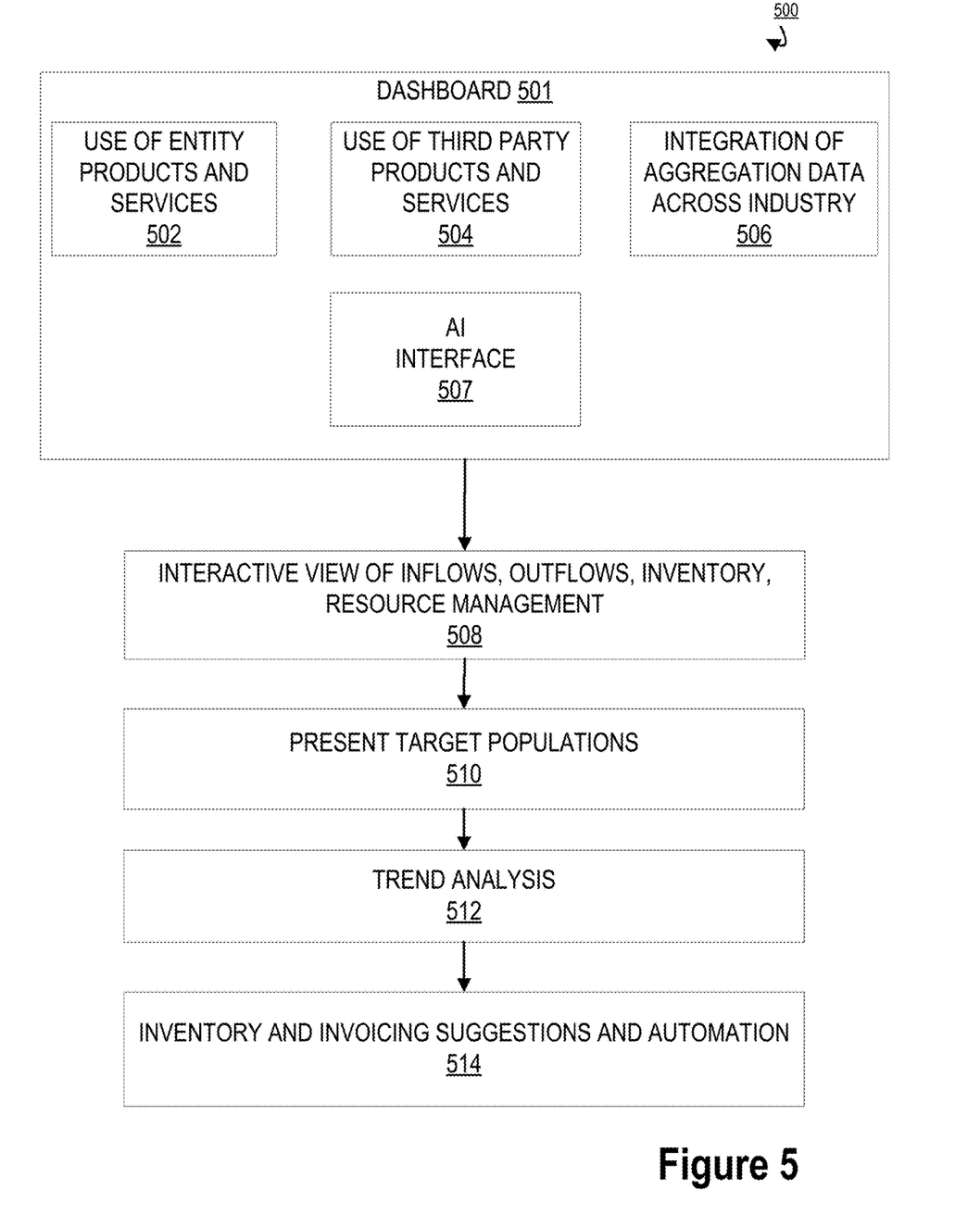
FIG. 5 provides a process map illustrating dashboard implementation and function, in accordance with one embodiment of the present invention.

FIG. 5 illustrates a process map illustrating dashboard implementation and function 500, in accordance with one embodiment of the present invention. As illustrated, the dashboard 501 comprises information about the user and his/her use of the products and services provided by the entity as related to selling/buying goods as a user, business, or the like, as illustrated in block 502. The dashboard 501 also comprises information about the business use of third party products and services as illustrated in block 504. The dashboard 501 also comprises information about the business from an integration of aggregation data across the industry, as illustrated in block 506. In this way, the system may gather information across the entity industry. In other embodiments, the system may receive the information across the entity industry from aggregation entities. The dashboard 501 may also comprise an AI interface, as illustrated in block 507. The AI interface may illustrate a predictive future resource flow, invoicing, and the like, based on a review historic user data.

In some embodiments, the dashboard 501 provides a value added information medium that illustrates how the user is utilizing products and services from a financial institution, third parties, the user business systems, and the like. The tangible application allows for communication from the application to the financial institution, third party, and business systems to conduct business and alter resource displacement from the dashboard. As such, the dashboard accesses and controls the applications associated with the financial institution and third parties so that the user may perform payroll, resource organization, inventory, invoicing, or the like. The dashboard also provides future looks at resource flow, including prediction of inflows, outflows, inventory, payroll, and the like based on historic data adjustments.

As illustrated in block 508, the process 500 continues by generating an interactive view of inflows, outflows, inventory, and resource management. In this way, the system generates a dashboard illustrating the resources of user, the resource management, inflows, outflows, inventory, and the like associated with the user and/or the user business. The system may extract data from the user, third parties, aggregation systems, the financial institution, and the like.

As illustrated in block 510, the process 500 continues by presenting targeted populations for the business to target for additional customers. The system may identify customers that are using competing entities, or the like associated with competitor customers. The system may identify this information based on the extraction of data from the user device, third party devices, entity devices, or third party aggregation systems. In this way, the system may identify competitor entities and the customers associated with the competitor based on customer transaction data with those customers. In this way, the system may identify the customer, the competitor, and the product purchased by the customer during the transactions with the competitor.

In some embodiments, the system may further provide trend analysis, as illustrated in block 512. In some embodiments, trend analysis provides an indication to the user of potential customers or potential products that will bring customers to the business. In this way, the analysis may identify underpenetrated customer populations with respect to marketing or the like and present marketing options, offers, or the like to penetrate customer populations.

In some embodiments, a market generator tool is presented along with the dashboard. The market generator tool provides marketing ideas and concepts based on the dashboard categories, from the entity, user, and third party systems, for targeting additional customers. The provided marketing ideas are also presented with the expected outcomes of the market ideas.

As illustrated in block 514, the process 500 continues by providing inventory and invoicing suggestions and automation. As such, the system may automatically inventory appropriate products at the business based on expected sales. The expected sales may be calculated off of historic sales for the business, historic competitor trends, and/or current competitor trends. Furthermore, the system may identify trends in product pricing, such as when an inventory item may fluctuate in price. The system may suggest and/or recommend times to purchase products for inventory based on the price fluctuation to maximize resource availability. Furthermore, in some embodiments, the system may provide the user with a payment account for purchasing the inventory. As such, the system may identify a payment account, such as a credit account, cash, or the like for purchase of the inventory. Furthermore, the system may identify a loan or borrowing option for purchasing the inventory. The identified product may be applied for and submitted to the appropriate third party for acceptance.

Figure 6:
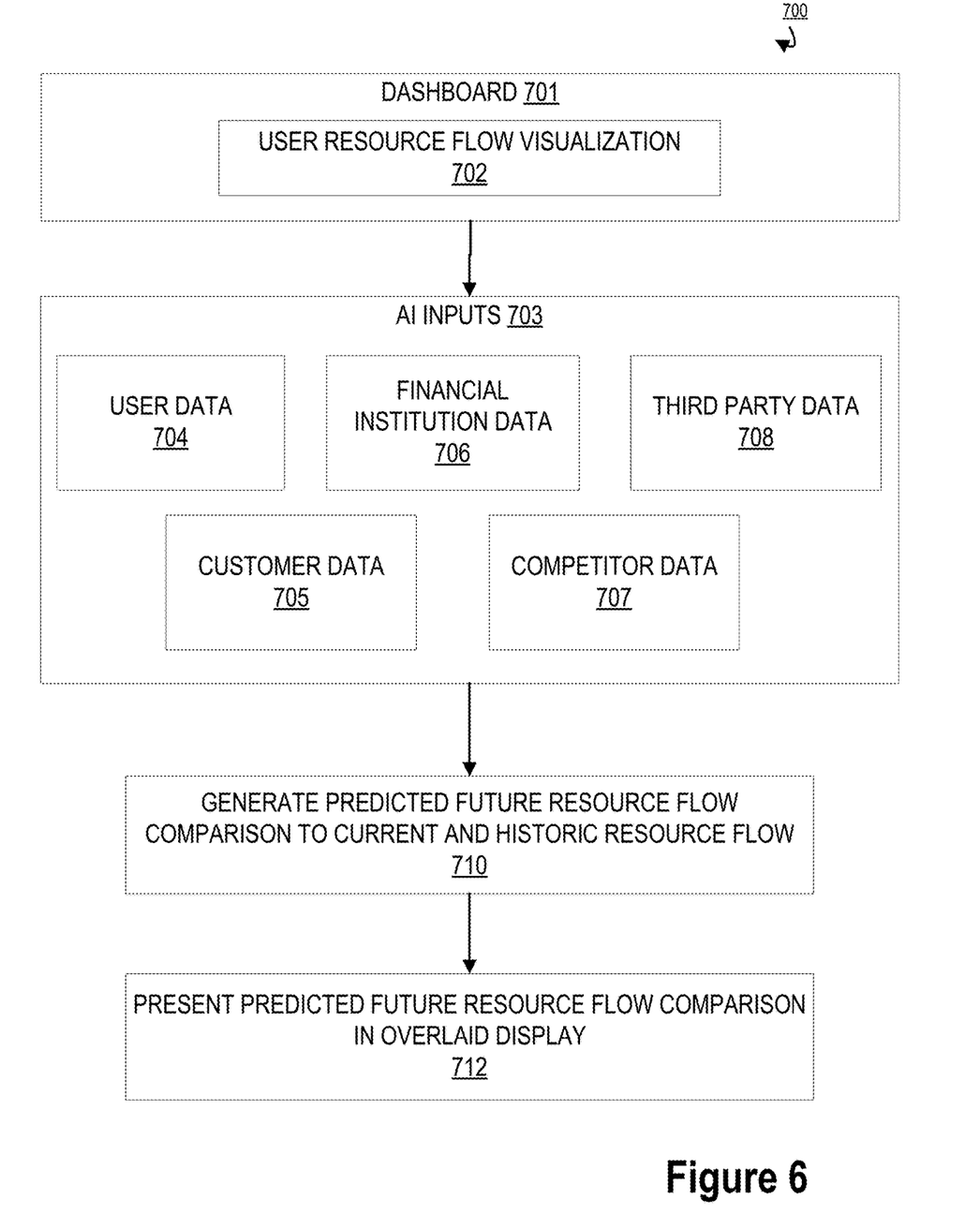
FIG. 6 provides a process map illustrating artificial intelligence implementation into the dashboard implementation and function, in accordance with one embodiment of the present invention.

FIG. 6 provides a process map illustrating artificial intelligence implementation into the dashboard implementation and function 700, in accordance with one embodiment of the present invention. As illustrated in block 701, the system provides a dashboard for the user. The dashboard 701 include user resource flow information for user visualization, as illustrated in block 702. As illustrated, the dashboard 701 comprises information about the user and his/her use of the products and services provided by the entity as related to selling/buying goods as a user, business, or the like.

The dashboard also comprises information about the business use of third party products and services. The dashboard also comprises information about the business from an integration of aggregation data across the industry. In this way, the system may gather information across the entity industry. In other embodiments, the system may receive the information across the entity industry from aggregation entities. In some embodiments, the dashboard provides a value added information medium that illustrates how the user is utilizing products and services from a financial institution, third parties, the user business systems, and the like. The tangible application allows for communication from the application to the financial institution, third party, and business systems to conduct business and alter resource displacement from the dashboard. As such, the dashboard accesses and controls the applications associated with the financial institution and third parties so that the user may perform payroll, resource organization, inventory, invoicing, or the like. The dashboard also provides future looks at resource flow, including prediction of inflows, outflows, inventory, payroll, and the like based on historic data adjustments.

As illustrated in block 703, the process 700 continues by illustrating the inputs for the AI engine. These inputs include user data 704, financial institution data 706, third party data 708, customer data 705, and competitor data 707. Using this data the AI engine may generate an AI interface for display on the dashboard. The AI interface may illustrate a predictive future resource flow, invoicing, and the like, based on a review historic user data.

As illustrated in block 710, the process 700 continues by generating a predicted future resource flow comparison to current and historic resource flows. As illustrated in block 712, the process 700 is finalized by presenting the predicted future resource flow information and comparison in an overlaid display on the dashboard. In this way, the system may display future resource flows for the user, user business, or the like as projected based on real-time data from various sources via the mission control hub.

Figure 7:
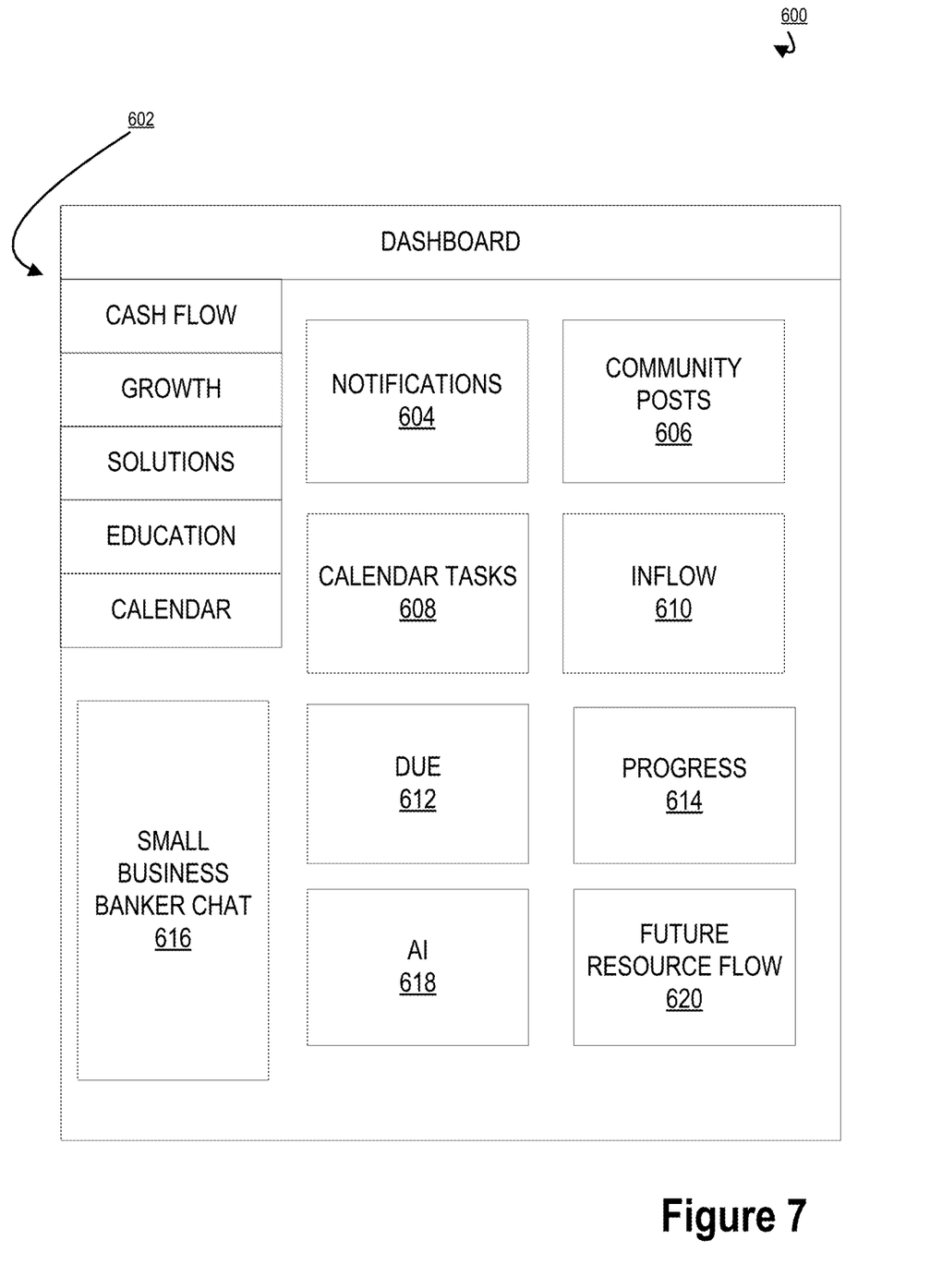
FIG. 7 provides a process map illustrating dashboard implementation and function, in accordance with one embodiment of the present invention.

FIG. 7 provides a process map illustrating dashboard implementation and function 600, in accordance with one embodiment of the present invention. The dashboard provides a mission control location for a user to manage a user or business day to day operations. The dashboard incorporating data from multiple sources and converts it into a platform for visualization and manipulation for the user. As such, solving complexity, lack of resource, and lack of insight issues associated with operations. The dashboard provides a complete view with integration of third party platforms and solutions for user manipulation. Furthermore, the invention provides an actionable insight that allows the translation of aggregated data into actionable insight and completion of decision processing. The system may provide third party platforms integrated into the application for streaming and visualization by the user. In this way, the system may control third party applications from the dashboard.

In some embodiments, the dashboard may provide a user with resource flow, growth goals, tasks, solutions, community, customer support, credit monitoring, banker insight, partner linkages, marketplace for supply purchasing, bill payment, artificial intelligence support, predictive modeling, AI resource flow predictions, and tiered modeling for the user visualization and manipulation.

As illustrated, the application may comprise one or more selectable tabs 602. The selectable tabs 602 include the dashboard, resource flow, growth solutions, education, and a calendar. The resource flow tab provides the user with an indication of the real-time resource flow. The growth tab illustrates the growth over a period of time in the past. The solutions tab provides the user with various solution options. The education tab provides education for various aspects, such as financial, legal, tax, or the like. The calendar tab provides a calendar of events and key dates.

As illustrated, the dashboard has been selected from the selectable tabs 602. The dashboard may be manipulated by the user to integrate one or more elements for quick visualization. In the dashboard illustrated in FIG. 7, the use has implemented a notification element 604, a community posts element 606, a calendar of tasks element 608, an inflow element 610, a due element 612, a progress element 614, AI element 618, and a small business banker chat element 616. As illustrated, the notification element 604 may provide answers to questions such as growing the user customer base, new solutions such as local market intelligence, business trends, and invoices due. The community posts element 606 provides an integrated platform with questions from users within the user community. The calendar of tasks element 608 presents the use with a calendar of upcoming events. The inflow element 610 illustrates a quick view of the inflows during a day/week/month/year. The due element 612 illustrates upcoming due dates for payments to a third party. The progress element 614 illustrates progress towards a goal in sales or revenue, or the like. The small business banker chat element 616 communicable links the user with a banking representative to communicate with via the secure communicable linkage. The AI element 618 illustrates a future resource flow projection based on current and historic resource flows, user information, customer information, competitor information, and the like. The elements may be extracted from third parties, manipulated into system requirements, and posted on the dashboard for user interaction and manipulation. In this way, the dashboard may allow a user to access and manipulate third party systems via the dashboard display.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for aggregated resource application, the system comprising:
    a memory device with computer-readable program code stored thereon;
    a communication device;
    a processing device operatively coupled to the memory device and the communication device, wherein the processing device is configured to execute the computer-readable program code to:
        implement within a user system, wherein the user system communicates with a third party exchange system;
        request authorization for uplink of the user system and the third party exchange system for extraction of resource flows;
        uplink, upon receiving authorization, the user system and third party exchange system for extraction of resource flows of the user, wherein the uplink comprises generating a communicable linkage to extract resource flow data from the user system and the third party systems and the communicable linkage further comprises an internal communication linkage to an entity system sponsoring the aggregated resource application;
        process competitor sales and inventory and aggregate the competitor sales and inventory;
        generate, via artificial intelligence engine, a predicted future resource flow comparison, wherein generating the predicted future resource flow comparison comprises receiving real-time data from the user system and third party systems and correlating the real-time data with historic data for predictive analysis of future resource flows;
        generate an interactive dashboard for visualization of categories, wherein the categories include a use of third party resources, system resources, and aggregation data across from aggregation of the competitor sales and inventory in an industry;
        perform a trend analysis, via artificial intelligence engine, on the aggregated competitor sales and inventory to identify underpenetrated customer populations;
        calculate, using extracted resource flow data from the user system and the third party systems, predicted inventory requirements for targeting the underpenetrated customer populations, wherein the predicted inventory are calculated by analyzing market changes in inventory, past orders for the inventory, and a recommended time frame and resource type to purchase additional inventory;
        extract, via data received over the communicable linkage, information regarding third party exchange products comprising payments, lending, and merchant services that the user utilizes from the third party exchange system;
        allow access to the user system, the third party systems, and the system resources for inventory and resource distribution;

present the interactive dashboard on display of the user system with overlaid multi-source data comprising predicted future resource flow comparison, third party exchange products, and predicted inventory requirements from the artificial intelligence engine; and convert the multi-source data into an incorporated multi-source converted data platform via overlay for user manipulation and communication with sources via the communicable linkage.

2. The system of claim 1, further comprising identifying underrepresented customers and trends for identify potential customers for the user from online and offline.

3. The system of claim 1, wherein presenting the interactive dashboard further comprises presenting inventory purchase recommendations based on market analysis for products of the inventory and identified predicted price fluctuation for the products of the inventory.

4. The system of claim 1, further comprising generating a private communicable linkage with the third party systems for integration of the aggregated resource application into the third party systems and the user system.

5. The system of claim 1, wherein the aggregated resource application is provided by a resource distribution entity used by the user, wherein the resource distribution entity is a financial institution providing payroll, loan options, insurance, or account storage for the user, wherein the user is a small business.

6. The system of claim 1, wherein implementing within the user system further comprises integration of the interactive dashboard for visualization of categories that allows the user for selection and third party system interaction.

7. A computer program product for aggregated resource application, the computer program product comprising at least one non-transitory computer-readable medium having computer-readable program code portions embodied therein, the computer-readable program code portions comprising:

an executable portion configured for implementing within a user system, wherein the user system communicates with a third party exchange system;

an executable portion configured for requesting authorization for uplink of the user system and the third party exchange system for extraction of resource flows;

an executable portion configured for uplinking, upon receiving authorization, the user system and third party exchange system for extraction of resource flows of the user, wherein the uplink comprises generating a communicable linkage to extract resource flow data from the user system and the third party systems and the communicable linkage further comprises an internal communication linkage to an entity system sponsoring the aggregated resource application;

an executable portion configured for processing competitor sales and inventory and aggregate the competitor sales and inventory;

an executable portion configured for generating, via artificial intelligence engine, a predicted future resource flow comparison, wherein generating the predicted future resource flow comparison comprises receiving real-time data from the user system and third party systems and correlating the real-time data with historic data for predictive analysis of future resource flows;

an executable portion configured for generating an interactive dashboard for visualization of categories, wherein the categories include a use of third party resources, system resources, and aggregation data across from aggregation of the competitor sales and inventory in an industry;

an executable portion configured for performing a trend analysis, via artificial intelligence engine, on the aggregated competitor sales and inventory to identify underpenetrated customer populations;

an executable portion configured for calculating, using extracted resource flow data from the user system and the third party systems, predicted inventory requirements for targeting the underpenetrated customer populations, wherein the predicted inventory are calculated by analyzing market changes in inventory, past orders for the inventory, and a recommended time frame and resource type to purchase additional inventory;

an executable portion configured for extracting, via data received over the communicable linkage, information regarding third party exchange products comprising payments, lending, and merchant services that the user utilizes from the third party exchange system;

an executable portion configured for allowing access to the user system, the third party systems, and the system resources for inventory and resource distribution;

an executable portion configured for presenting the interactive dashboard on display of the user system with overlaid multi-source data comprising predicted future resource flow comparison, third party exchange products, and predicted inventory requirements from the artificial intelligence engine; and an executable portion configured for converting the multi-source data into an incorporated multi-source converted data platform via overlay for user manipulation and communication with sources via the communicable linkage.

8. The computer program product of claim 7, further comprising an executable portion configured for identifying underrepresented customers and trends for identify potential customers for the user from online and offline.

9. The computer program product of claim 7, wherein presenting the interactive dashboard further comprises presenting inventory purchase recommendations based on market analysis for products of the inventory and identified predicted price fluctuation for the products of the inventory.

10. The computer program product of claim 7, further comprising an executable portion configured for generating a private communicable linkage with the third party systems for integration of the aggregated resource application into the third party systems and the user system.

11. The computer program product of claim 7, wherein the aggregated resource application is provided by a resource distribution entity used by the user, wherein the resource distribution entity is a financial institution providing payroll, loan options, insurance, or account storage for the user, wherein the user is a small business.

12. The computer program product of claim 7, wherein implementing within the user system further comprises integration of the interactive dashboard for visualization of categories that allows the user for selection and third party system interaction.

13. A computer-implemented method for aggregated resource application, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

implementing within a user system, wherein the user system communicates with a third party exchange system;

requesting authorization for uplink of the user system and the third party exchange system for extraction of resource flows;

uplinking, with user upon receiving authorization, system and third party exchange system for extraction of resource flows of the user, wherein the uplink comprises generating a communicable linkage to extract resource flow data from the user system and the third party systems and the communicable linkage further comprises an internal communication linkage to an entity system sponsoring the aggregated resource application;

processing competitor sales and inventory and aggregate the competitor sales and inventory;

generating, via artificial intelligence engine, a predicted future resource flow comparison, wherein generating the predicted future resource flow comparison comprises receiving real-time data from the user system and third party systems and correlating the real-time data with historic data for predictive analysis of future resource flows;

generating an interactive dashboard for visualization of categories, wherein the categories include a use of third party resources, system resources, and aggregation data across from aggregation of the competitor sales and inventory in an industry;

performing a trend analysis, via artificial intelligence engine, on the aggregated competitor sales and inventory to identify underpenetrated customer populations;

calculating, using extracted resource flow data from the user system and the third party systems, predicted inventory requirements for targeting the underpenetrated customer populations, wherein the predicted inventory are calculated by analyzing market changes in inventory, past orders for the inventory, and a recommended time frame and resource type to purchase additional inventory;

extracting, via data received over the communicable linkage, information regarding third party exchange products comprising payments, lending, and merchant services that the user utilizes from the third party exchange system;

allowing access to the user system, the third party systems, and the system resources for inventory and resource distribution;

presenting the interactive dashboard on display of the user system with overlaid multi-source data comprising predicted future resource flow comparison, third party exchange products, and predicted inventory requirements from the artificial intelligence engine; and converting the multi-source data into an incorporated a multi-source converted data platform via overlay for user manipulation and communication with sources via the communicable linkage.

14. The computer-implemented method of claim 13, further comprising identifying underrepresented customers and trends for identify potential customers for the user from online and offline.

15. The computer-implemented method of claim 13, wherein presenting the interactive dashboard further comprises presenting inventory purchase recommendations based on market analysis for products of the inventory and identified predicted price fluctuation for the products of the inventory.

16. The computer-implemented method of claim 13, further comprising generating a private communicable linkage with the third party systems for integration of the aggregated resource application into the third party systems and the user system.

17. The computer-implemented method of claim 13, wherein the aggregated resource application is provided by a resource distribution entity used by the user, wherein the resource distribution entity is a financial institution providing payroll, loan options, insurance, or account storage for the user, wherein the user is a small business.

* * * * *